(12) United States Patent
Liu

(10) Patent No.: US 8,148,940 B2
(45) Date of Patent: Apr. 3, 2012

(54) MULTIFUNCTIONAL VEHICLE CHARGER AND CHARGING PROCESS OF THE SAME

(76) Inventor: Yun-Zhao Liu, Zhongshan (CN)

( * ) Notice: Subject to any disclaimer, the term of this patent is extended or adjusted under 35 U.S.C. 154(b) by 415 days.

(21) Appl. No.: 12/379,839

(22) Filed: Mar. 3, 2009

(65) Prior Publication Data

US 2010/0225269 A1 Sep. 9, 2010

(51) Int. Cl.
- *H02J 7/00* (2006.01)
- *H02J 7/04* (2006.01)
- *H02J 7/02* (2006.01)

(52) U.S. Cl. ........ 320/114; 320/107; 320/111; 320/141; 320/160; 320/162; 307/2; 307/151; 362/183

(58) Field of Classification Search .................. 320/107, 320/111, 114, 141, 160, 162; 307/2, 151; 362/183

See application file for complete search history.

(56) References Cited

U.S. PATENT DOCUMENTS

| | | | | |
|---|---|---|---|---|
| 6,774,603 B2 * | 8/2004 | Liao | ............................. | 320/107 |
| 7,170,259 B2 * | 1/2007 | Veselic | ....................... | 320/114 |
| 7,317,996 B2 * | 1/2008 | Ahmed et al. | ................... | 702/63 |
| 2003/0117104 A1 * | 6/2003 | Liao | .............................. | 320/107 |
| 2008/0185990 A1 * | 8/2008 | Hsu | ................................ | 320/103 |
| 2008/0231233 A1 * | 9/2008 | Thornton | ...................... | 320/137 |
| 2009/0309548 A1 * | 12/2009 | Carkner | ......................... | 320/136 |

* cited by examiner

*Primary Examiner* — Patrick Assouad
*Assistant Examiner* — Steve T Chung
(74) *Attorney, Agent, or Firm* — Rosenberg, Klein & Lee

(57) ABSTRACT

The present invention relates to a multi-functional vehicle charger and the charging process of the same. The vehicle charger includes an enclosure defining the vehicle charger. The enclosure includes a USB port disposed thereon, a power plug corresponding to a vehicle power outlet on one end, and a wire connected with a power terminal at the other end. The power terminal, the USB port, and the power plug are connected to a charge monitor circuit. Thus the vehicle charger can be connected with various electrical appliances for charging by insertion of the power terminal on the wire into a socket of a Li-ion battery and by a connecting wire that connects the USB port to electric appliances with USB functionality. Thereby, power is supplied by various output ends when the vehicle charger is inserted into a power outlet in vehicles.

2 Claims, 5 Drawing Sheets

MULTIFUNCTIONAL VEHICLE CHARGER AND CHARGING PROCESS OF THE SAME

BACKGROUND OF THE INVENTION

1. Field of Invention

The present invention relates to a multi-functional vehicle charger and charging process of the same, especially to a charger that not only charges lithium ion batteries with sockets by connection with a power outlet in a vehicle and conversion of a charge monitor circuit but also supplies power to various electrical appliances allowing for USB functionality, and the charge monitor circuit as well as Li ion batteries therein by a USB port. In various applications, the practical values of the multi-functional vehicle charger are increased.

2. Description of Related Art

Along with striking economic progress, people are getting richer and becoming to afford more. People start to use various commodities and appliances that make lives easier and more convenient. Among these products, cars have become one of our daily essentials. The cars can dramatically reduce the time we spend on transportation and protect us from rain and wind. Moreover, cars not only can carry people but also transport goods. Thus more and more people buy the cars and streets as well as roads are always full of cars.

Due to popularity of cars, various accessories applied to cars are also available in the markets now. Among these accessories, the charging apparatus is a common one used relatively often. The charging apparatus generally includes a charge connector that is disposed with a power plug on one end, corresponding to a power outlet in vehicles, while the other end thereof is connected with a plug-in terminal of the charging apparatus. Thus by the power outlet in vehicles, the charging apparatus is supplied with a power However, although by the charge connector plugged into the power outlet in vehicles, the charger gets power from the vehicles and uses it. In practice, it is found that various charging devices have different plug-in terminals so that the charge connector can only be applied to charging apparatuses with compatible plug-in terminals. Some other charging devices are unable to connect with the charge connector. This causes inconvenience or loss of use. Or the respective charging devices require to be equipped with corresponding charge connectors so that the cost rises. Thus there is a need for improvement.

SUMMARY OF THE INVENTION

Therefore, it is a primary object of the present invention to provide a multi-functional vehicle charger and the charging process of the same, wherein the vehicle charger is disposed with a power plug corresponding to a power outlet in vehicles, a wire connected with a power terminal and a USB (Universal Serial Bus) port. The power terminal is connected with a charge monitor circuit for the Li-ion batteries in the vehicle charger while the USB port is connected with the power plug. Thus the charger can be charged by the power terminal on the wire being inserted into Li-ion batteries with sockets. The charger can also supply power to various electrical appliances allowing for USB functionality and with the charge monitor circuit as well as the Li-ion battery therein by a corresponding connecting wire that connects the electrical appliance with the USB port of the vehicle charger.

Thereby by being plugged into the power outlet in vehicles, the vehicle charger provides various power supply ways to different output ends. The vehicle charger can supply power to various objects such as Li-ion batteries with sockets, or electrical appliances with USB functionality. Therefore, the practical values of the charger are increased.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
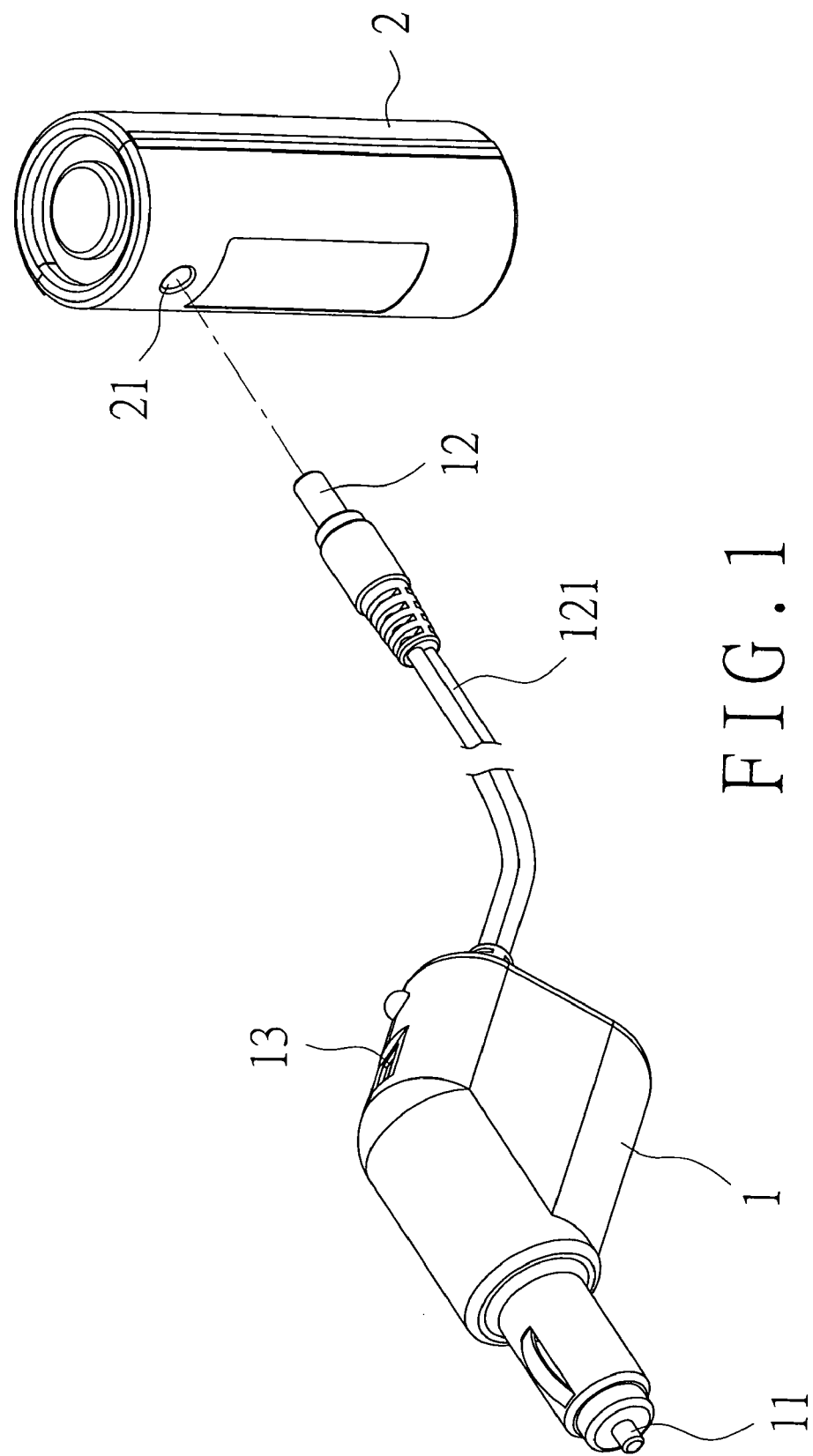
FIG. 1 is a perspective view of an embodiment according to the present invention.
Figure 2A:
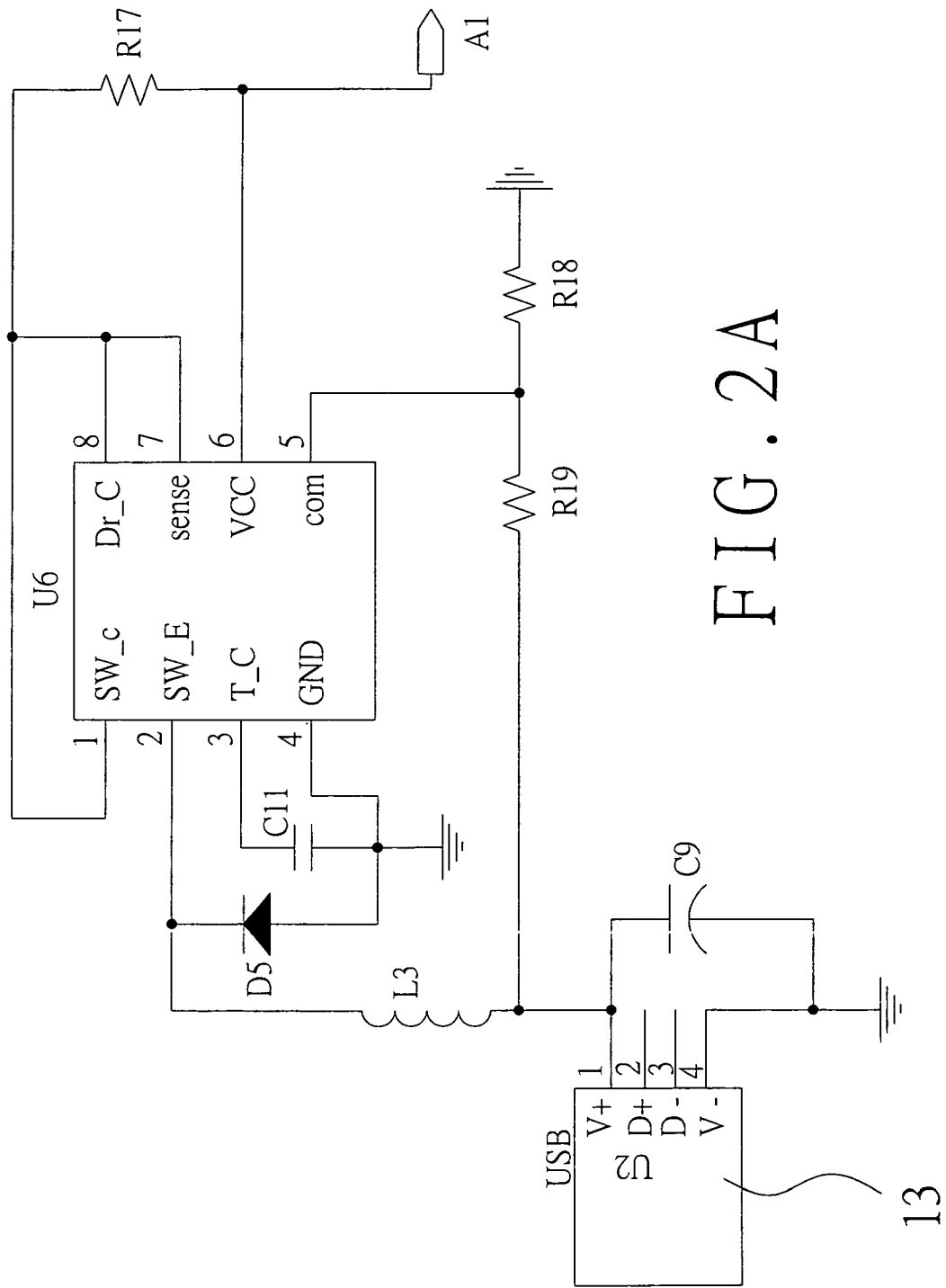
FIGS. 2A-2C are circuit diagrams of an embodiment according to the present invention.
Figure 2B:
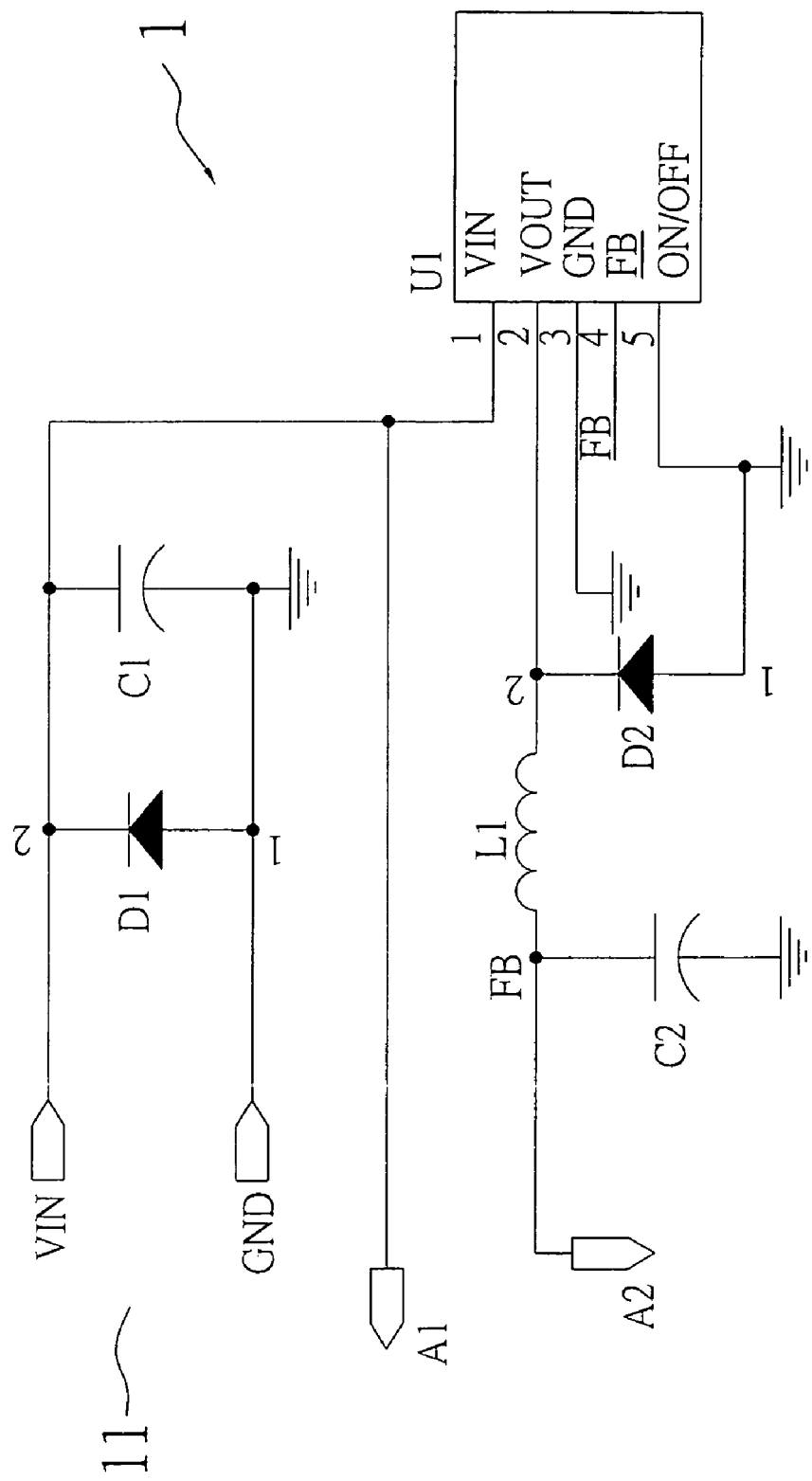
Figure 2C:
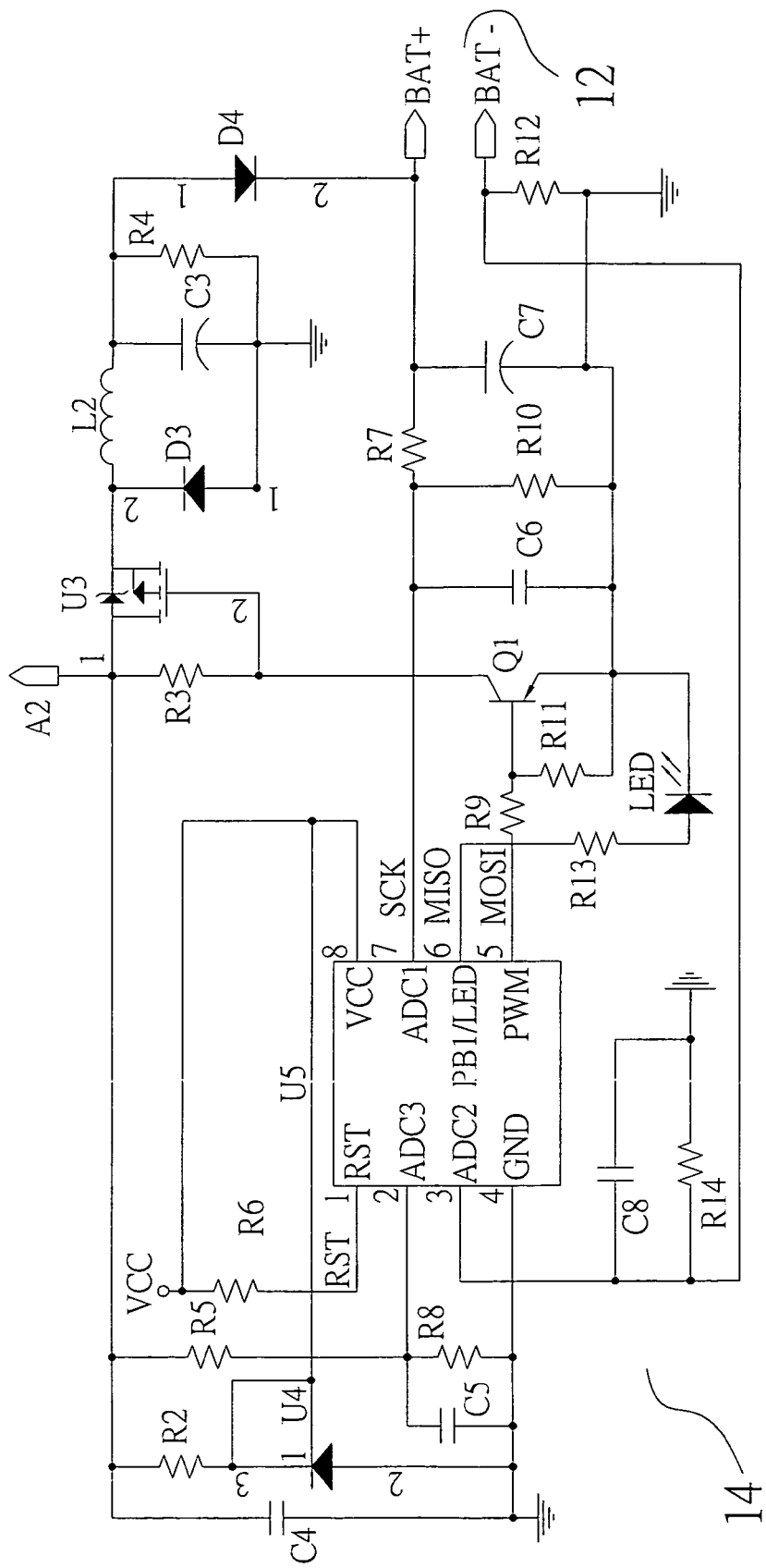

Refer to FIG. 1 and FIGS. 2A-2C, a perspective view of an embodiment according to the present invention and a circuit diagram are revealed. A vehicle charger (1) of the present invention consists of a power plug (11) corresponding to a vehicle power outlet on one end and a power terminal (12) connected with the vehicle charger (1) by a wire (121). Corresponding to the power terminal (12), there is a lithium ion battery (2) with a socket (21) and the power terminal (12) is inserted in the socket (21) of the lithium ion (Li-ion) battery (2). The vehicle charger (1) further includes a USB (Universal Serial Bus) port (13) on the surface and a charge monitor circuit (14) for the Li-ion battery (2) inside. The charge monitor circuit (14) is connected with the wire (121) of the power terminal (12) while the USB port (13) is connected with the power plug (11).

Thereby, by the power plug (11) being inserted into the power outlet in vehicles, the power output from the vehicle power outlet passes through the charge monitor circuit (14) for the Li-ion battery (2) in the vehicle charger (1) for being converted into proper voltage and sends to the connected power terminal (12) by the wire (121). Then through the power terminal (12) inserted into the socket (21) of the Li-ion battery (2), the Li-ion battery (2) is charged.

The charging process of the charge monitor circuit (14) toward the Li-ion battery (2) is described as following: firstly, detect voltage of the Li-ion battery (2) connected. As to forced discharge Li-ion battery (2) without output voltage, the Li-ion battery (2) is charged in a low-current and fast pulse mode. When the voltage of the Li-ion battery (2) is lower than the preset voltage, a low current that is one tenth (0.1) of the Li-ion battery (2) capacity is used to charge the Li-ion battery (2) in a constant-current float charging mode. For example, charging current for 4000 mAh Li-ion battery (2) is 4000 mA×0.1=400 mA. When the voltage of the Li-ion battery (2) is increased over the preset voltage, a low current that is one half (0.5) of the Li-ion battery (2) capacity is used to charge the Li-ion battery (2) in a constant-current equalizing charging mode. For example, charging current for 4000 mAh Li-ion battery (2) is 4000 mA×0.5=2000 mA. When the voltage of the Li-ion battery (2) is increased to rated voltage, start using a constant voltage that is the rated voltage of the Li-ion battery (2) to charge the Li-ion battery (2) in a constant voltage charging mode. Now the charging current gradually fails to a low value. When the charging current is lower than the low current that is one tenth of the Li-ion battery (2) capacity, stop charging. The charging process is ended. When the voltage of the Li-ion battery (2) is lower than its rated voltage, the charging process is initiated and repeated again.

Figure 3:
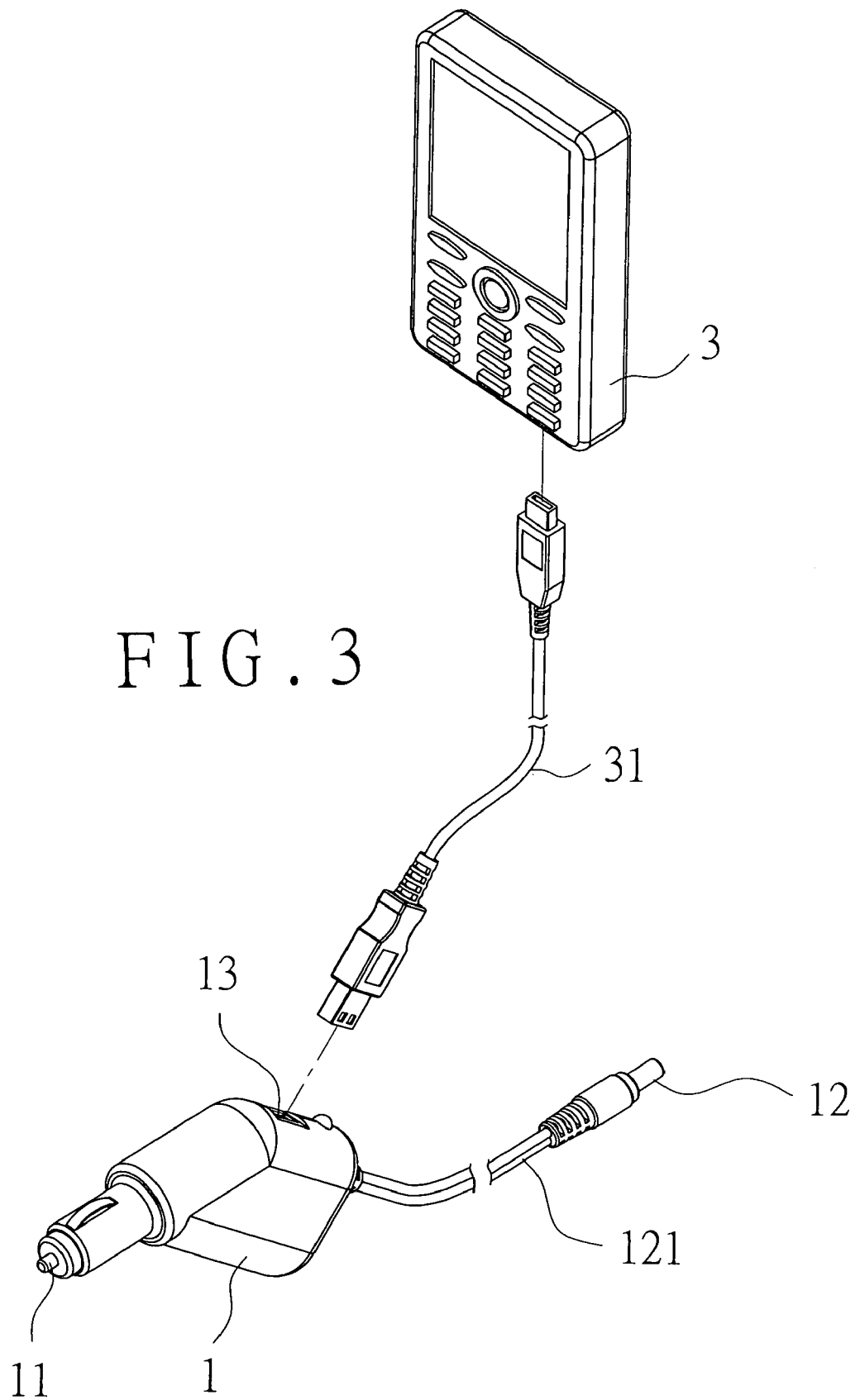
FIG. 3 shows an embodiment of the present invention connected to electrical appliances allowing for USB functionality.

Refer to FIG. 3, an electrical appliance with USB functionality is connected with an embodiment of the present invention. The vehicle charger can also be applied to other electrical appliances (3) with USB functionality, the a charge monitor circuit and Li-ion batteries such as mobile phones or other digital products. A corresponding USB connecting wire (31) is used to connect the electrical appliance (3) with the USB port (13) of the vehicle charger (1) and simultaneously the power plug (11) of the vehicle charger (1) is inserted into the power outlet in the vehicle. Thus power from the power outlet of the vehicles passes through the power plug (11) of the vehicle charger (1), the USB port (13), and the USB connecting wire (31) to be provided to the electrical appliance (3) with USB functionality. By the power from the USB port (13), the electrical appliance (3) charges the Li-ion battery therein by the charge monitor circuit therein.

In summary, compared with the vehicle chargers available now, the vehicle charger of the present invention includes multiple output ends—a power terminal connected by a wire and a USB port. Thus the present invention can not only charge the Li-ion batteries by connection of the power terminal on the wire with the socket of the Li-ion battery, but also supply power to the electrical appliances with USB functionality by a corresponding connecting wire that connects the USB port and the electrical appliances having charge monitor circuit and Li-ion batteries disposed therein. Thus by various output ends of the vehicle charger, different ways of power supply are provided. The power is sent to various objects such as Li-ion batteries or electrical appliances with USB functionality. Thus by the power from the USB port, the charge monitor circuit in the electrical appliance charges the Li-ion battery therein. Therefore, the practical values of the vehicle charger are improved.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A multifunctional vehicle charger comprising:
   a charger portion;
   a power plug corresponding to a power outlet in vehicles disposed on one end of the charger portion,
   a wire coupled to the charger portion and connected with a power terminal for charging interconnection to a lithium ion (Li-ion) battery; and
   a Universal Serial Bus (USB) port disposed on the charger portion for interconnection of electrical appliances having charge monitor circuits and Li-ion batteries by a corresponding USB connecting wire;
   wherein the charger portion includes a charge monitor circuit coupled to the wire with the power terminal, and the USB port is directly connected with the power plug;
   wherein the charge monitor circuit selectively actuates a plurality of alternative charging modes responsive to a voltage of the battery being charged, wherein alternative charging mode includes: a low-current fast pulse charging mode, a constant-current float charging mode, a constant-current equalizing charging mode, and a constant voltage charging mode.

2. A method for charging electrical appliances using a multifunctional vehicle charger, having a charge monitor circuit installed therein, comprising the steps of:
   detecting voltage of a Li-ion battery connected to the vehicle charger connected, wherein the charge monitor circuit selectively actuates a plurality of alternative charging modes responsive to a voltage of the battery being charged;
   for a discharged Li-ion battery without output voltage, the Li-ion battery being charged in a low-current and fast pulse charging mode;
   when the voltage of the Li-ion battery is lower than a preset voltage, a low current that is one tenth of the Li-ion battery capacity being used to charge the Li-ion battery in a constant-current float charging mode;
   when the voltage of the Li-ion battery is increased over the preset voltage, a low current that is one-half of the Li-ion battery capacity being used to charge the Li-ion battery in a constant-current equalizing charging mode;
   when the voltage of the Li-ion battery is increased to rated voltage, a constant voltage that is a rated voltage of the Li-ion battery being maintained to charge the Li-ion battery in a constant voltage charging mode whereby the charging current gradually falls to a low value;
   when the charging current is lower than the low current that is one tenth of the Li-ion battery capacity, the charging process is ended; and
   when the voltage of the Li-ion battery is lower than the rated voltage thereof, the charging process is initiated and repeated again.

* * * * *